United States Patent
Zheng et al.

(10) Patent No.: US 9,568,252 B2
(45) Date of Patent: Feb. 14, 2017

(54) HEAT PIPE BASED PASSIVE RESIDUAL HEAT REMOVAL SYSTEM FOR SPENT FUEL POOL

(75) Inventors: Mingguang Zheng, Shanghai (CN); Cheng Ye, Shanghai (CN); Xiankang Dong, Shanghai (CN); Guoxing Gu, Shanghai (CN); Jinquan Yan, Shanghai (CN); Yong Wang, Shanghai (CN); Yu Chen, Shanghai (CN); Xia Su, Shanghai (CN); Yu Chen, Shanghai (CN); Liuhua Shen, Shanghai (CN); Libing Zhu, Shanghai (CN); Wei Shi, Shanghai (CN); He Sun, Shanghai (CN)

(73) Assignee: SHANGHAI NUCLEAR ENGINEERING RESEARCH & DESIGN INSTITUTE, Shanghai (CN)

(*) Notice: Subject to any disclaimer, the term of this patent is extended or adjusted under 35 U.S.C. 154(b) by 16 days.

(21) Appl. No.: 14/130,169

(22) PCT Filed: Jun. 20, 2012

(86) PCT No.: PCT/CN2012/077200
§ 371 (c)(1),
(2), (4) Date: Nov. 18, 2014

(87) PCT Pub. No.: WO2013/159440
PCT Pub. Date: Oct. 31, 2013

(65) Prior Publication Data
US 2015/0060018 A1    Mar. 5, 2015

(30) Foreign Application Priority Data

Apr. 27, 2012    (CN) .......................... 2012 1 0127359

(51) Int. Cl.
*G21C 19/07* (2006.01)
*F28D 15/02* (2006.01)
(Continued)

(52) U.S. Cl.
CPC ........... *F28D 15/02* (2013.01); *F28D 15/0266* (2013.01); *G21C 19/07* (2013.01); *G21C 19/08* (2013.01); *G21C 15/257* (2013.01)

(58) Field of Classification Search
CPC .... F28D 15/02; F28D 15/0266; F28D 15/043; G21C 19/08; G21C 19/07; G21C 15/257
(Continued)

(56) References Cited

U.S. PATENT DOCUMENTS 6,802,671 B1* 10/2004 Badie .................. F28D 15/0266
376/272
2005/0220256 A1 10/2005 Singh
2012/0051484 A1* 3/2012 Schmidt ................. G21C 19/07
376/273

FOREIGN PATENT DOCUMENTS

CA    1124090    5/1982
CN    1305076    3/2007
(Continued)

OTHER PUBLICATIONS

International Search Report for International Patent Application No. PCT/CN2012/077200 mailed Feb. 7, 2013.
(Continued)

*Primary Examiner* — Jack W Keith
*Assistant Examiner* — Daniel Wasil
(74) *Attorney, Agent, or Firm* — McAndrews, Held & Malloy, Ltd.

(57) ABSTRACT

A heat pipe based passive residual heat removal system for a spent fuel pool (3). Partitions (6) are arranged around an inside of the spent fuel pool. Evaporation-end heat pipes (4) are arranged between the outside of the partitions and an inner wall of the pool. The evaporation-end heat pipes have outlets that extend beyond the pool and are connected to an Inlet of an ascending pipe (10), and have inlets connected to an outlet of a descending pipe (5). Condensation-end heat pipes (7) have inlets connected to an outlet of the ascending pipe, and have outlets connected to an inlet of the descending pipe. The heat pipes cool the spent fuel pool. A heat
(Continued)

exchange by phase change of working medium in the heat pipe leads to heat exchange of low temperature difference and high efficiency, relying on density difference for natural circulation drive.

6 Claims, 2 Drawing Sheets

(51) Int. Cl.
  *G21C 19/08* (2006.01)
  *G21C 15/257* (2006.01)

(58) Field of Classification Search
  USPC ... 165/104.19, 185; 376/272, 274, 275, 298, 376/299, 367; 250/506.1, 507.1
  See application file for complete search history.

(56) References Cited

FOREIGN PATENT DOCUMENTS

| | | | |
|---|---|---|---|
| CN | 101710494 A | 5/2010 | |
| CN | 101740147 | 6/2010 | |
| CN | 101958155 | 1/2011 | |
| CN | 202178067 | 3/2012 | |
| DE | 3002641 A1 | 7/1981 | |
| DE | 3517632 | 11/1986 | |
| JP | H02223896 A | 9/1990 | |
| JP | 6-294891 A | * 10/1994 | ............. G21C 19/07 |
| JP | H06294891 A | 10/1994 | |
| KR | 100951398 B1 | 4/2010 | |

OTHER PUBLICATIONS

Yao Shouguang et al., Model Experiment of Large Scale Separate Type Heat Pipe Heat-Exchanger, Journal of East China Shipbuilding Institute, 1997, 11(2): 38-43 (English Abstract provided).

Zhang Guangyu et al., Applications of Heat Pipe in Nuclear Power Engineering, Atomic Energy Science and Technology, 1997, 31(1): 89-96 (English Abstract provided).

Zhao Xiaobao, Analysis and Amendment of Design Factors about Heat Pipe of Screen Wicks, Journal of Nanjing Normal University(Engineering and Technology), 2004, 4(3): 7-10 (English Abstract provided).

* cited by examiner

HEAT PIPE BASED PASSIVE RESIDUAL HEAT REMOVAL SYSTEM FOR SPENT FUEL POOL

FIELD OF THE INVENTION

The present invention relates to the field of nuclear power plant security technology and to a passive cooling system using low temperature difference of heat pipes to efficiently remove the residual heat of the spent fuel pool in the nuclear power plant.

DESCRIPTION OF THE PRIOR ART

The security of a nuclear power plant is an important element in a design for the nuclear power plant. Following the nuclear accidents at Three Mile Island and Chernobyl, the nuclear power plant accident in Fukushima once again sounded the alarm to nuclear power development in the world. The third-generation reactor AP1000 introduced from the Unite States by China use passive security systems, relying on gravity, temperature difference and compressed gas expansion and other natural forces to drive the security system without depending on the pump, AC power and Class 1E emergency diesel generators, etc. Therefore, it can ensure the security of nuclear power plants within 72 hours after a serious accident without relying on the external operations. The passive safety system design on AP1000 is an innovative design. However, when the serious accident lasts for more than 72 hours, spent fuel pools and containment components still keep on releasing heat, so the continuous passive residual heat removal from such components remain as a challenge of keeping long-term security of the nuclear power plants.

Currently the residual heat removal of spent fuel pool is actualized mainly through the spent fuel pool residual heat removal system. Under the action of a pump, the water withdrawn from the spent fuel pool reaches the external heat exchanger in which the water is cooled by cooling water so as to discharge heat. The method relies on a pump driven by power and need continuously provided cooling water, so that the reliability of the cooling system is poor when severe accident occurs.

SUMMARY OF THE INVENTION

The objective of the present invention is to overcome the defects in the prior art by providing a heat pipe based passive cooling system for a spent fuel pool, which uses separate heat pipe technology to remove the residual heat of the spent fuel pool with high efficiency and low temperature difference, relying on natural circulation driving system without external driving force, with the advantage of reliable operation.

To achieve the above objective, the invention adopts the following technical scheme: a heat pipe based passive residual heat removal system for a spent fuel pool, wherein a spent fuel assembly is arranged inside a spent fuel pool; a plurality of partitions are arranged around the inside of the spent fuel pool, the heights of the several partitions are all lower than the height of the spent fuel pool; a plurality of partition holes are made on the lower part of each of the partitions;

a plurality of evaporation-end heat pipes are arranged between the outside of the partitions and an inner wall of the spent fuel pool, these evaporation-end heat pipes are divided into several groups; top outlets of each group of evaporation-end heat pipes are extended beyond the spent fuel pool and connected to an inlet of an ascending pipe, an outlet of the ascending pipe is connected to top inlets of a group of condensation-end heat pipes comprising a plurality of condensation-end heat pipes, bottom outlets of said group of condensation-end heat pipes are connected to an inlet of a descending pipe, an outlet of the descending pipe is extended downwardly into the spent fuel pool and connected to bottom inlets of a group of evaporation-end heat pipes;

working medium flows in turn through the evaporation-end heat pipes, the ascending pipe, the condensation-end heat pipes and the descending pipe, and returns back to the evaporation-end heat pipes, forming a closed residual heat removal loop; the each group of condensation-end heat pipes all are arranged inside the lower part of a chimney; the heights of each group of condensation-end heat pipes all are higher than the heights of each group of evaporation-end heat pipes.

For the heat pipe based passive residual heat removal system for the spent fuel pool as the above, the outlets of all the evaporation-end heat pipes comprised in the each group of evaporation-end heat pipes are collected in a same connecting box, an outlet of the connecting box communicates with an inlet of an ascending pipe; the inlets of all the evaporation-end heat pipes comprised in the each group of evaporation-end heat pipes are collected in a same connecting box, an inlet of the connecting box is connected to an outlet of a descending pipe.

For the heat pipe based passive residual heat removal system for the spent fuel pool as the above, the inlets of all condensation-end heat pipes comprised in the each group of condensation-end heat pipes are collected in a same connecting box, an inlet of the connecting box communicates with an outlet of an ascending pipe; the outlets of all evaporation-end heat pipes comprised in the each group of condensation-end heat pipes are collected in a same connecting box, an outlet of the connecting box communicates with an inlet of a descending pipe.

For the heat pipe based passive residual heat removal system for the spent fuel pool as the above, said plurality of evaporation-end heat pipes are arranged in form of two to four layers between the outside of the partitions and an inner wall of the spent fuel pool.

For the heat pipe based passive residual heat removal system for the spent fuel pool as the above, the working medium is water, methanol, ethanol, acetone or ammonia.

For the heat pipe based passive residual heat removal system for the spent fuel pool as the above, the heights of the plurality of partitions is one-third to four-fifths of the height of the spent fuel pool.

The technical effects of the present invention are as follows: the heat pipe based passive residual heat removal system for the spent fuel pool disclosed by the present invention employs the heat pipes for cooling the spent fuel pool, so that a heat exchange by phase change of a heat pipe working medium leads to heat exchange with low temperature difference and high efficiency, relying on density difference for natural circulation and driving and using chimney for providing cool air source, thus fundamentally eliminating reliance on power source and personnel, and thereby implementing long-term passive high efficiency heat exchange for cooling the spent fuel pool with high reliability.

In the figures: 1. spent fuel assembly; 2. partition hole; 3. spent fuel pool; 4. evaporation-end heat pipe; 5. descending pipe; 6. partition; 7. condensing-end heat pipe; 8 chimney; 9. connecting box; 10. ascending pipe.

DETAILED DESCRIPTION OF THE PREFERRED EMBODIMENTS

The heat pipe based passive residual heat removal system for the spent fuel pool according to the invention will be more readily understood from the following description of the embodiments thereof given, with reference to the accompanying drawings.

Figure 1:
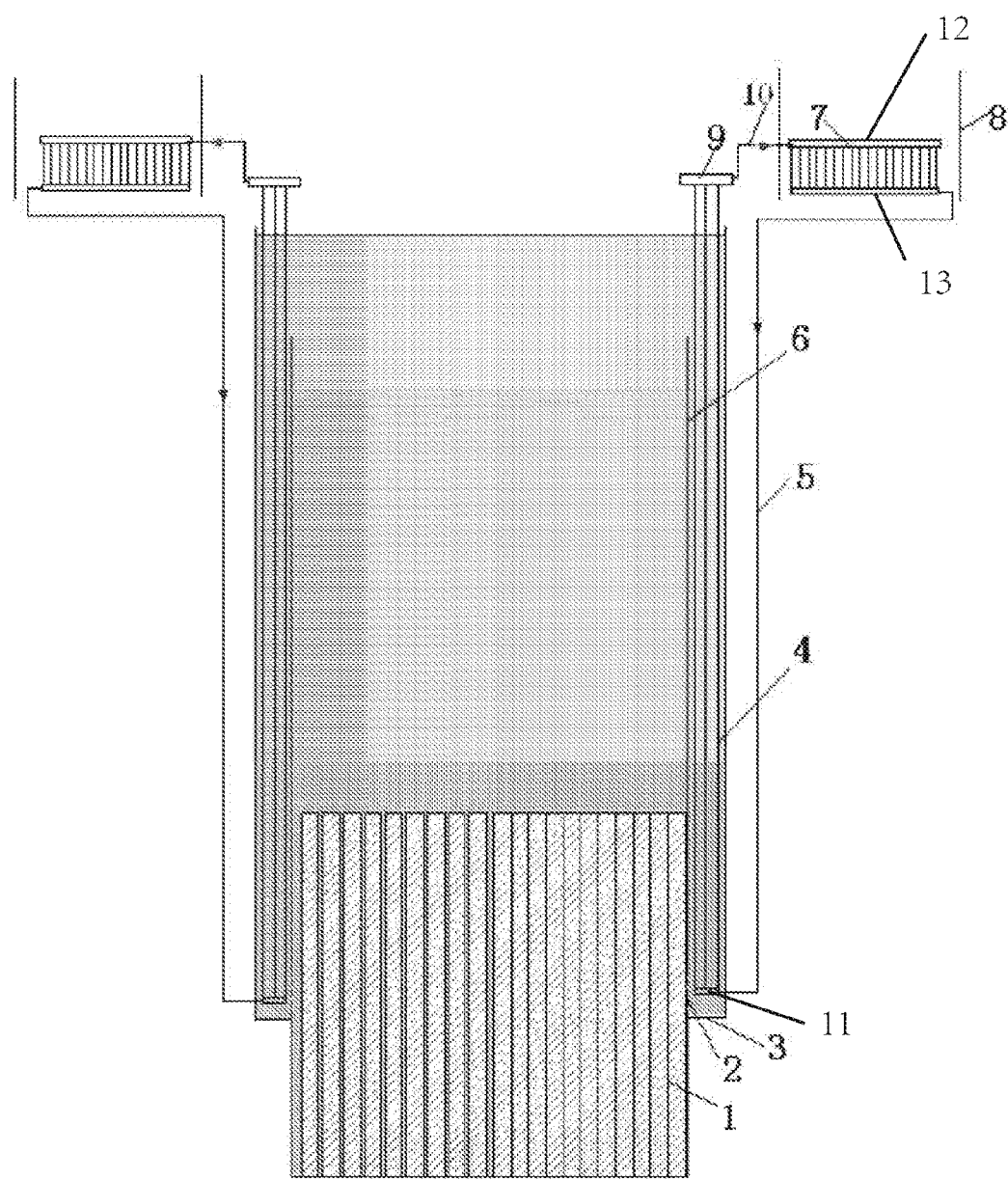
FIG. 1 is a schematic structural diagram of a heat pipe based passive residual heat removal system for the spent fuel pool according to the present invention.

As shown in FIG. 1, the heat pipe based passive residual heat removal system for the spent fuel pool according to the present invention mainly includes a spent fuel pool 3, a spent fuel assembly 1, a partition 6, evaporation-end heat pipes 4, a condensing-end heat pipe 7, a descending pipe 5, a connecting box 9 and chimney 8.

Figure 2:
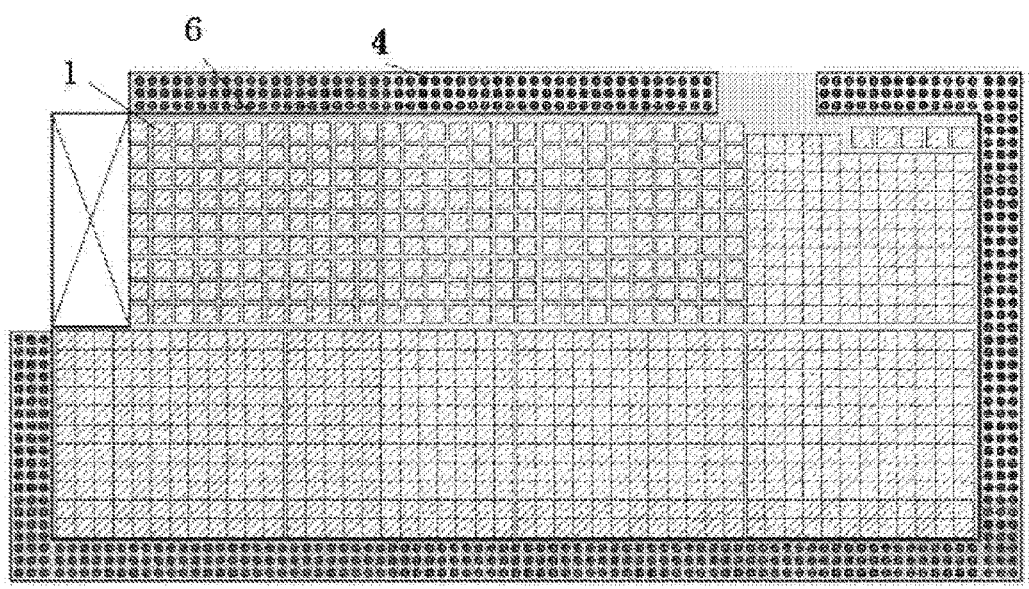
FIG. 2 is a cross-sectional diagram of the arrangement of the evaporation-end, heat pipe inside a spent fuel pool.

As shown in FIG. 2, the spent fuel assembly 1 is arranged inside the spent fuel pool 3. Two partitions 6 are arranged around the inside of the spent fuel pool 3, and the height of each partition 6 is one-third to four-fifths (such as one-third or four-fifths) of the height of spent fuel pool 3. Meanwhile a plurality of partition holes 2 are provided on the lower part of each partition 6 as channels provided for water to flow through.

A plurality of evaporation-end heat pipes 4 are arranged in three layers between the outside of the two partitions 6 and an inner wall of the spent fuel pool 3, and these evaporation-end heat pipes 4 are divided into several groups; top outlets of each group of evaporation-end heat pipes are extended beyond the spent fuel pool 3 and connected to an inlet of a ascending pipe 10; an outlet of the ascending pipe 10 is connected to a top inlet of a group of condensation-end heat pipes 7 including a plurality of condensation-end heat pipes 7; bottom outlets of the group of condensation-end heat pipes 7 are connected to an inlet of a descending pipe 5; an outlet of the descending pipe 5 is extended downwardly into the spent fuel pool 3 and is connected to bottom inlets of a group of evaporation-end heat pipes. Each group of condensation-end heat pipes is arranged inside the lower part of the chimney 8; the heights of each group of condensation-end head pipes are higher than the heights of each group of evaporation-end heat pipes.

Each group of condensation-end heat pipes is arranged inside the lower part of the chimney 8 from which air may freely passes through the chimney may also be called air cooling tower.

Working medium flows in turn through the evaporation-end heat pipes 4, the ascending pipe 10, the condensation-end heat pipes 7 and the descending pipe 5, and returns back to the evaporation-end heat pipes 4, forming a closed residual heat removal loop. The working medium is water, methanol, ethanol, acetone or ammonia.

All the outlets of the evaporation-end heat pipes 4 included in above the each group of evaporation-end heat pipes may be collected in a same connecting box 9. An outlet of the connecting box 9 communicates with an inlet of an ascending pipe 10. All the inlets of evaporation-end heat pipes 4 included in the each group of evaporation-end heat pipes are collected in a same connecting box. An inlet of the connecting box communicates with an outlet of the descending pipe 5.

All the inlets of condensation-end heat pipes 7 included in the each group of condensation-end heat pipes are collected in a same connecting box. An inlet of the connecting box communicates with an outlet of the ascending pipe 10. All the outlets of evaporation-end heat pipes 7 included in the each group of condensation-end heat pipes are collected in a same connecting box. An outlet of the connecting box communicates with an inlet of a descending pipe 5.

The number of above said plurality of evaporation-end heat pipes 4 or plurality of condensation-end heat pipes 7 may be in the range of 500 to 2000, which is determined according to the power of the decay heat of the spent fuel, to make the quantity of heat produced by the spent fuel and carried by the plurality of evaporation-end heat pipes 4 equal to the quantity of heat carried by the plurality of condensation-end heat pipes cooled by air inside the chimney, so as to meet the requirement of the spent fuel cooling.

The operating theory of the heat pipe based passive residual heat removal system for the spent fuel pool according to the present invention is as described as follows: the inside of the spent fuel pool 3 is divided into inner and outer regions by partitions 6. The water within the inner region firstly receives the residual heat released by the spent fuel assembly 1, and then the temperature thereof rises up and water moves upwardly to enter the outer region of the spent fuel pool from the position above the partitions 6. The evaporation-end heat pipes 4 are arranged in the outer region where the water is cooled and moves downwardly to enter the inner region through the partition hole 2, so that, the inner and outer regions together form a natural recycle, bringing the heat released from the spent fuel to the evaporation-end heat pipes 4. The working medium inside the evaporation-end heat pipes 4 absorbs the heat and vaporizes to move upwardly to gather into the ascending pipe 10, and then reaches the condensation-end heat pipes 7 through the ascending pipe 10. The working medium is cooled by the air in the chimney 8 and turned into liquid phase through condensation. The density of the working medium in liquid phase is large, and under the action of gravity, the working medium returns to the evaporation-end heat pipes 4 via the descending pipe 5, thereby forming a residual heat removal loop. Though this loop, heat is transferred to the air in the chimney 8, and the heated air rises up, thereby forming convection. The air under normal temperature continuously enters into the chimney 8 from the bottom thereof. The heat from the spent fuel pool eventually is conducted to ambient air.

The present invention employs the heat pipes for cooling the spent fuel pool, so that a heat exchange by phase change of a heat pipe working medium leads to a heat exchange with low temperature difference and high efficiency, relying on density difference to achieve natural circulation and driving and using chimney for providing cool air source, thus fundamentally eliminating reliance on power source and personnel, and thereby implementing long-term passive high efficiency heat exchange for cooling the spent fuel pool with high reliability.

The invention claimed is:

1. A heat pipe based passive residual heat removal system for a spent fuel pool,
wherein the system comprises a spent fuel pool (3) and a spent fuel assembly (1),
wherein the spent fuel assembly (1) is disposed in the spent fuel pool (3),
characterized in that, a plurality of partitions (6) are arranged around an inside of the spent fuel pool (3), all heights of the plurality of partitions (6) are lower than a height of the spent fuel pool (3);

a plurality of partition holes (2) are made on a lower part of each of the partitions (6) as channels provided for water to flow through;

the system further comprises a plurality of evaporation-end heat pipes (4)

which are arranged between an outside of the partitions (6) and an inner wall of the spent fuel pool (3), and these evaporation-end heat pipes (4) are divided into several groups;

outlets of all the evaporation-end heat pipes (4) comprised in each group of evaporation-end heat pipes are extended beyond the spent fuel pool (3) and connected to an inlet of an ascending pipe (10), inlets of all the evaporation-end heat pipes (4) comprised in said each group of evaporation-end heat pipes (4) are connected to an outlet of a descending pipe (5) which is extended downwardly into the spent fuel pool (3);

the system further comprises a plurality of condensation-end heat pipes (7)

which are divided into several groups;

inlets of all the condensation-end heat pipes (7) comprised in each group of condensation-end heat pipes are connected to an outlet of the ascending pipe (10), outlets of all the condensation-end heat pipes (7) comprised in said each group of condensation-end heat pipes are connected to an inlet of the descending pipe (5);

working medium flows through, in turn, the evaporation-end heat pipes (4), the ascending pipe (10), the condensation-end heat pipes (7) and the descending pipe (5), and returns back to the evaporation-end heat pipes (4) to form a closed residual heat removal loop;

said each group of condensation-end heat pipes is arranged in a lower part of a chimney (8);

heights of each group of condensation-end heat pipes (7) all are higher than heights of each group of evaporation-end heat pipes (4).

2. The heat pipe based passive residual heat removal system according to claim 1, characterized in that, outlets of all the evaporation-end heat pipes (4) comprised in said each group of evaporation-end heat pipes are collected in a same first connecting box (9), an outlet of the first connecting box (9) communicates with an inlet of the ascending pipe (10); inlets of all the evaporation-end heat pipes (4) comprised in said each group of evaporation-end heat pipes are collected in a same second connecting box (11), and an inlet of the second connecting box (11) communicates with an outlet of the descending pipe (5).

3. The heat pipe based passive residual heat removal system according to claim 2, characterized in that, inlets of all the condensation-end heat pipes (7) comprised in said each group of condensation-end heat pipes are collected in a same third connecting box (12), an inlet of the third connecting box (12) communicates with an outlet of the ascending pipe (10); outlets of all the condensation-end heat pipes (7) comprised in said each group of condensation-end heat pipes are collected in a same fourth connecting box (13), and an outlet of the fourth connecting box (13) communicates with an inlet of the descending pipe (5).

4. The heat pipe based passive residual heat removal system according to claim 1, characterized in that, said plurality of evaporation-end heat pipes (4) are arranged in form of two to four layers between the outside of the partitions (6) and the inner wall of the spent fuel pool (3).

5. The heat pipe based passive residual heat removal system according to claim 1, characterized in that, the working medium is water, methanol, ethanol, acetone or ammonia.

6. The heat pipe based passive residual heat removal system according to claim 1, characterized in that, a height of the plurality of partitions (6) is one-third to four-fifths of a height of the spent fuel pool (3).

* * * * *